US010948582B1

(12) United States Patent
Hoffmann et al.

(10) Patent No.: US 10,948,582 B1
(45) Date of Patent: Mar. 16, 2021

(54) APPARATUS AND METHOD TO MEASURE SLIP AND VELOCITY

(71) Applicant: Apple Inc., Cupertino, CA (US)

(72) Inventors: Gabriel M. Hoffmann, Mountain View, CA (US); Christopher D. Gadda, Sunnyvale, CA (US); David A. Stronks, San Jose, CA (US); Ahmad Al-Dahle, San Jose, CA (US); Gregory E. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 16/294,650

(22) Filed: Mar. 6, 2019

Related U.S. Application Data

(63) Continuation of application No. 15/203,731, filed on Jul. 6, 2016, now Pat. No. 10,247,816.

(Continued)

(51) Int. Cl.
  *G01S 13/60* (2006.01)
  *G01M 17/02* (2006.01)
  (Continued)

(52) U.S. Cl.
  CPC ............. *G01S 13/60* (2013.01); *G01M 17/02* (2013.01); *G01S 13/86* (2013.01); *G01S 13/931* (2013.01)

(58) Field of Classification Search
  CPC ......... G01S 13/58; G01S 13/584; G01S 15/04
  See application file for complete search history.

(56) References Cited

U.S. PATENT DOCUMENTS

| 3,113,308 A | 12/1963 | Stavis |
| 3,833,906 A * | 9/1974 | Augustine ............... G01S 13/60 342/59 |

(Continued)

FOREIGN PATENT DOCUMENTS

| DE | 102011015935 | 10/2012 |
| EP | 2884299 | 6/2015 |

(Continued)

OTHER PUBLICATIONS

S.V. Baumgartner et al., "Acceleration-independent along-track velocity estimation of moving targets"; published in the journal, "IET Radar, Sonar, and Navigation"; vol. 4, issue 3; pp. 474-487; Institution of Engineering and Technology; Stevenage, Hertfordshire, UK; published in the year 2010. (Year: 2010).*

*Primary Examiner* — Bernarr E Gregory
(74) *Attorney, Agent, or Firm* — Polsinelli PC

(57) ABSTRACT

Aspects of the present disclosure involve a method for determining a road vehicle velocity and slip angle. The current disclosure presents a technique for identifying a vehicle's velocity and slip angle, in the vehicle's coordinate frame. In one embodiment, two or more sensors are orthogonally located on the underside of the vehicle in order to obtain longitudinal and lateral velocity information for slip angle determination. In another embodiment, the two or more sensors can include an array of elements for beam steering and receiver beamforming. Spatial diversity is leveraged in identifying at least a slip angle and/or velocity of the vehicle. Doppler mapping is used as a means for slip angle determination and the clutter ridge of the Doppler map is embraced for identifying the slip angle.

20 Claims, 7 Drawing Sheets

Related U.S. Application Data

(60) Provisional application No. 62/189,139, filed on Jul. 6, 2015.

(51) Int. Cl.
  *G01S 13/86* (2006.01)
  *G01S 13/931* (2020.01)
  *G01S 13/00* (2006.01)

(56) References Cited

U.S. PATENT DOCUMENTS

| | | | |
|---|---|---|---|
| 3,918,058 A | 11/1975 | Noyori et al. | |
| 3,974,500 A | 8/1976 | Goldfischer | |
| 4,050,071 A * | 9/1977 | Clorfeine | G01S 13/60 342/117 |
| 4,107,680 A * | 8/1978 | Kaplan | G01S 13/60 342/115 |
| 4,170,006 A | 10/1979 | Falk | |
| 4,349,897 A * | 9/1982 | Boehme | G01S 15/04 367/94 |
| 4,414,548 A * | 11/1983 | Carpenter | G01S 13/60 340/441 |
| 4,980,633 A * | 12/1990 | Roskoni | G01S 13/60 342/115 |
| 5,061,932 A * | 10/1991 | Tribe | G01S 13/931 342/70 |
| 5,189,425 A | 2/1993 | Dabbs | |
| 5,204,682 A * | 4/1993 | Beasley | G01S 13/60 342/117 |
| 5,579,012 A * | 11/1996 | Iwakuni | G01S 13/60 342/117 |
| 5,751,241 A * | 5/1998 | Lewiner | G01S 13/60 342/104 |
| 6,492,938 B1 | 12/2002 | Alland | |
| 6,606,052 B1 | 8/2003 | Miyahara | |
| 6,778,125 B1 | 8/2004 | Stewart et al. | |
| 7,508,337 B2 * | 3/2009 | Morinaga | G01S 13/584 342/109 |
| 7,545,313 B2 | 6/2009 | Okamura et al. | |
| 8,599,062 B2 * | 12/2013 | Szajnowski | G01S 13/931 342/109 |
| 9,024,809 B2 | 5/2015 | Testar | |
| 2001/0054976 A1 | 12/2001 | Sauer | |
| 2007/0090991 A1 | 4/2007 | Yoshikawa et al. | |
| 2008/0122680 A1 | 5/2008 | Morinaga et al. | |
| 2009/0201193 A1 | 8/2009 | Hilsebecher et al. | |
| 2010/0017128 A1 * | 1/2010 | Zeng | G01S 13/60 701/301 |
| 2010/0176921 A1 * | 7/2010 | Frederick | G01S 13/58 340/10.1 |
| 2015/0070207 A1 | 3/2015 | Millar et al. | |
| 2015/0369912 A1 | 12/2015 | Kishigami et al. | |

FOREIGN PATENT DOCUMENTS

| | | | | |
|---|---|---|---|---|
| GB | 2148651 A * | 5/1985 | | G01S 13/60 |
| WO | WO 2009/147406 | 12/2009 | | |
| WO | WO 2017/208670 | 12/2017 | | |

* cited by examiner

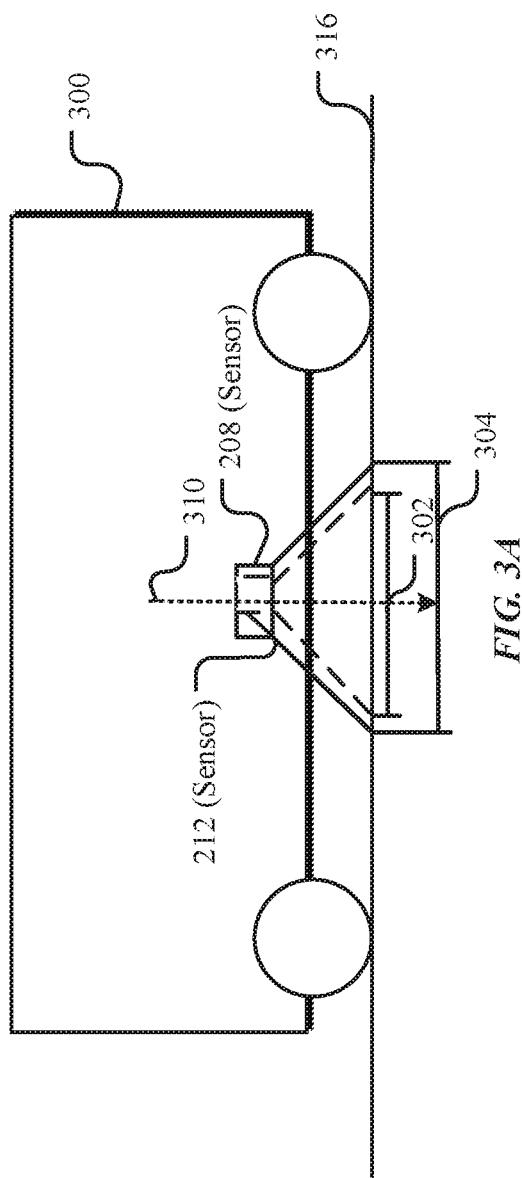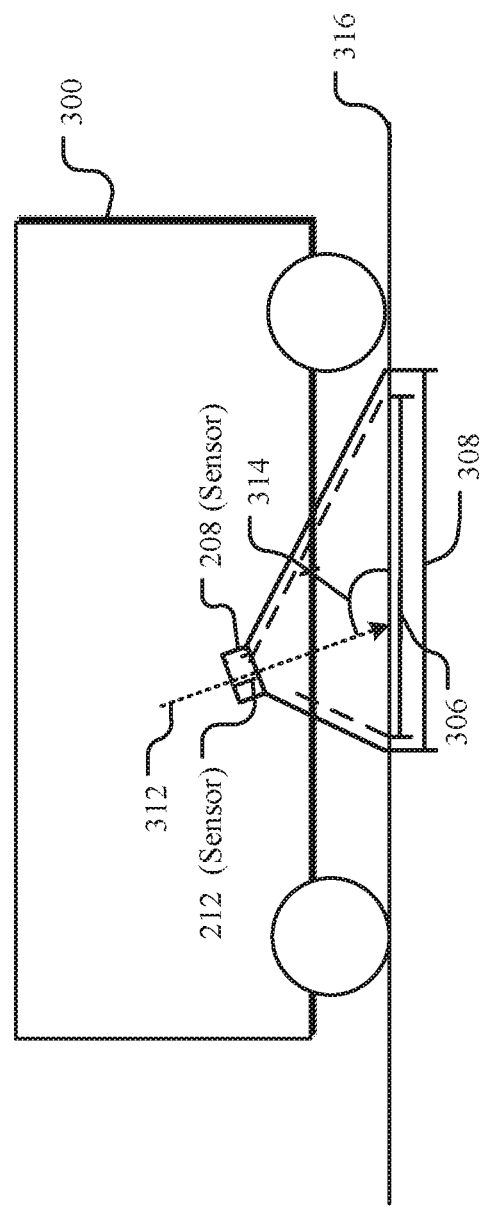

APPARATUS AND METHOD TO MEASURE SLIP AND VELOCITY

CROSS REFERENCE TO RELATED APPLICATIONS

This application is a continuation of U.S. patent application Ser. No. 15/203,731, filed Jul. 6, 2016, now U.S. Pat. No. 10,247,816, titled "APPARATUS AND METHOD TO MEASURE SLIP AND VELOCITY," which is related to and claims priority under 35 U.S.C. § 119(e) from U.S. Patent Application Ser. No. 62/189,139, filed Jul. 6, 2015, titled "APPARATUS AND METHOD TO MEASURE SLIP AND VELOCITY." The entire contents of each application are incorporated herein by reference for all purposes.

TECHNICAL FIELD

This disclosure relates generally to road vehicles, and more specifically to a method for determining a vehicle's road velocity and tire slip state.

BACKGROUND

Road vehicles use tires that are compliant air-filled structures that exert force on the road by continually deforming and slipping relative to the road. For road vehicle stability and traction, modern vehicle control systems often use an estimate of how the vehicle moves with respect to the road. Accurately estimating road-relative velocity vectors is of particular importance as velocity can be used for feedback control, position estimation, detection, and intelligent response to tire nonlinearities and sliding. However, because of the compliance of the tires, directional stiffness, the radius of the tire, among other things, can vary as well as various factors such as temperature, pressure, wear, and load from the car and road, can make conventional approaches to velocity estimation challenging.

In response, safety systems have been developed that can determine the road-relative velocity using wheel encoders, inertial sensors, and Global Navigation Satellite Systems (GNSS), among others. However, the current safety systems are often insufficient and can provide inaccurate road-relative velocity. For example, inertial sensors require the integration of noisy accelerometers which can experience drift, making velocity and slip determinations challenging. GNSS systems such as Global Positioning Systems (GPS) are often unreliable and subject to jammers, which similarly makes the use of GPS challenging for road relative velocity and other computations.

SUMMARY

Implementations described and claimed herein address the foregoing challenges by providing apparatuses and methods for facilitating slip angle and velocity measurements. In one embodiment a method includes receiving first set of electromagnetic waves from a first sensor to determine a first frequency response from the electromagnetic waves received. The first frequency response is located within a first clutter ridge. The method further includes receiving a second set of electromagnetic waves from a second sensor to determine a second frequency response. The second frequency response, like the first is also located within a second clutter ridge. Using the first and second frequency response, Doppler slopes are generated and used to determine a slip angle and a velocity.

In another embodiment, a system includes a first beamforming sensor configured to transmit a first set of electromagnetic waves in the direction of a road. The first beamforming sensor can also receive the reflected first set of electromagnetic waves. A second beamforming sensor is configured to transmit a second set of electromagnetic waves in the direction of the road and receive the reflected second set of electromagnetic waves. A hardware computing unit is configured to receive the reflected first plurality of electromagnetic waves from the first beamforming sensor and determine a first signal transform from the reflected first set of electromagnetic waves received from the first beamforming sensor. The first signal transform is located within a first clutter ridge. The hardware computing unit is further configured to receive the reflected second set of electromagnetic waves from the second beamforming sensor and determine a second signal transform from the reflected second set of electromagnetic waves received from the second beamforming sensor. The second signal transform is located within a second clutter ridge. The hardware computing unit generates a first Doppler slope from the first signal transform and a second Doppler slope from the second signal transform and determines a slip angle and a velocity.

In still another implementation a computer-readable data storage medium includes instructions that, when executed by at least one processor of a device, cause the device to perform operations including obtaining a first set of electromagnetic waves from a first beamforming sensor and perform a first spatial transformation of the first set of electromagnetic waves received from the first beamforming sensor. The device can also determine a first dominant slope of a first Doppler map generated from the first spatial transformation and receive a second set of electromagnetic waves from a second beamforming sensor. The device can further perform a second spatial transformation on the second set of electromagnetic waves received from the second beamforming sensor and determining a second dominant slope of a second Doppler map generated from the second spatial transformation. Using a trigonometric computation a slip angle using the first dominant slope and the second dominant slope is determined.

BRIEF DESCRIPTION OF THE DRAWINGS

The disclosure will be readily understood by the following detailed description in conjunction with the accompanying drawings, wherein like reference numerals designate like structural elements, and in which:

FIG. 3A illustrates of a horizontal positioning of orthogonally oriented sensors on an underside of a vehicle, in one embodiment.

FIG. 3B illustrates a non-horizontal positioning of orthogonally oriented sensors on an underside of a vehicle, in one embodiment.

DETAILED DESCRIPTION

Figure 1:
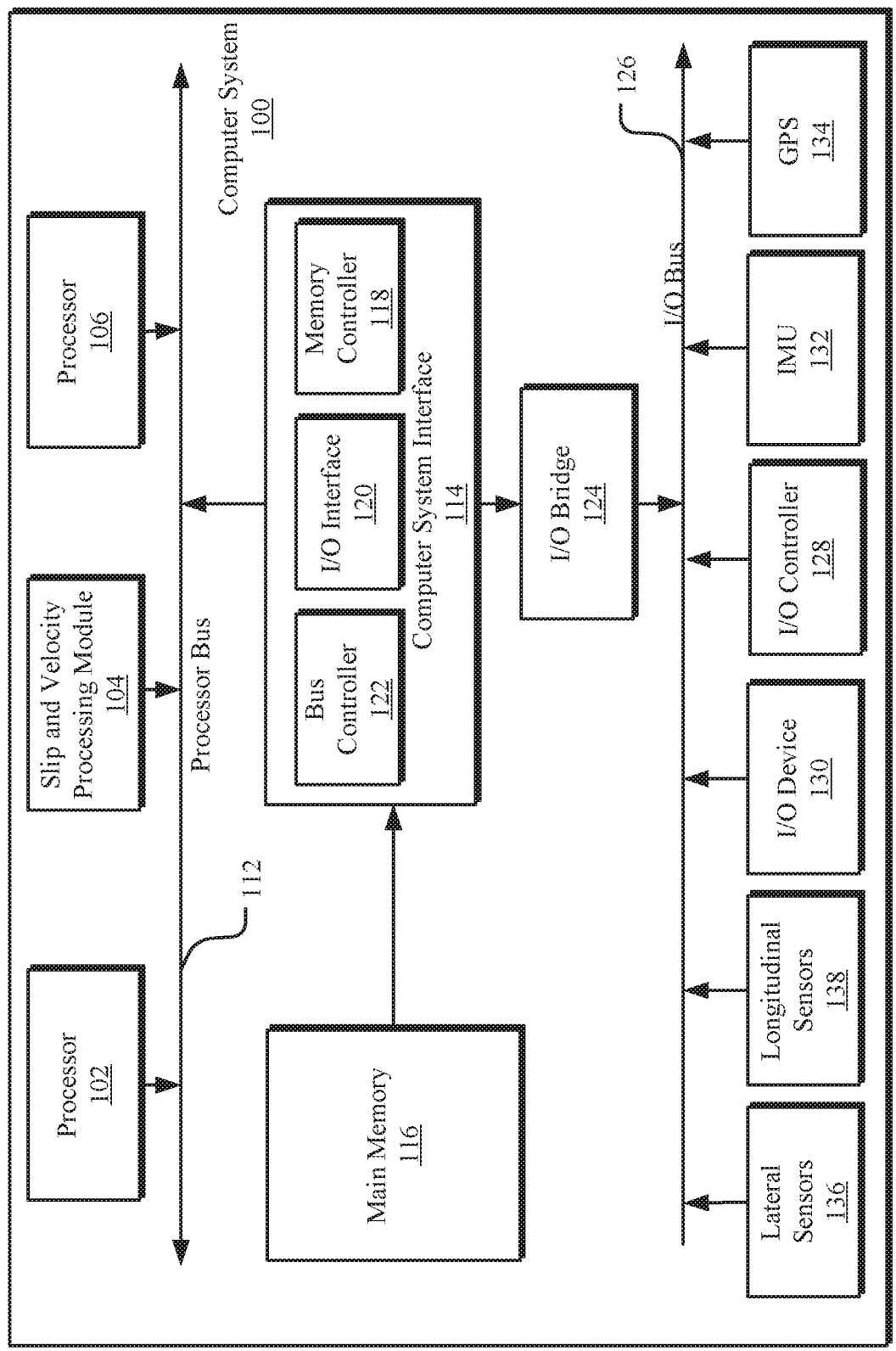
FIG. 1 illustrates a system architecture for a road vehicle.

Aspects of the present disclosure involve a set of sensors used for determining the velocity and slip angle of a vehicle. In one embodiment, one or more orthogonally arranged sensors are located in an under-vehicle space and positioned such that the road or other surface the vehicle travels on is in a field of view of the sensors. The orthogonally placed sensors may be mounted horizontally (parallel with the road) or positioned in a semi-horizontal manner and the information from the sensors used to compute the vehicle velocity, as well as discrete lateral and longitudinal components of velocity. The information from the sensors may also be used to compute the vehicle slip angle. The sensors may be antenna arrays or ultrasonic sensors in various possible embodiments. Further, in some arrangement, the sensors can create a beamformer which can exploit spatial diversity to enhance the velocity determination.

In addition to the one or more orthogonally placed sensors, an Inertia Measuring Unit (IMU) can be collectively used with the orthogonally placed sensors to independently extrapolate velocity before or while the orthogonal sensors are being used to determine velocity and slip angles and independently or in supplement may also be used for noise reduction. Additionally or alternatively, external positioning and velocity measurements such as those provided by a Global Positioning System (GPS) unit can also be collectively used with the sensors for error correction and location synchronization. Further, additional sensors (e.g., yaw, wheel speed, gyroscopic, ultrasonic sensors) may be placed on the underside of the vehicle to create a triad of sensors which can provide further information for the velocity measurement, relative to a two sensor system. The triad of sensors can be used to eliminate the effect of vehicle heave rate, roll rate, and pitch rate.

Various embodiments described herein, as well as combinations thereof, provide mechanisms for collecting data for measuring slip and velocity of a vehicle. In one specific example, the systems provide an estimate of slip and vehicle velocity using the information from the sensors placed on the underside of a road vehicle. The placement of the sensors on the under-side of the vehicle provide a reliable technique that can account for stability and traction issues that can arise as road vehicles encounter tire deformations and slippage, and might affect the accuracy of a conventional system. The systems set out herein provide a solution that improves velocity estimation in a wide variety of conditions as well as at and beyond vehicular handling limits where tire slip and the like are more pronounced. Knowledge of these handling limits can be of great benefit especially when encountering circumstances such as an icy surface, where the vehicle may slip and travel cannot necessarily be understood from tire rotation information and the like. In addition, the embodiments can also provide feedback signals which can assist with currently existing driver systems such as cruise control, anti-lock braking (ABS), electronic stability control (ESC), etc. Still further, systems discussed herein can also assist in the identification of objects and the determination of whether the object is static or mobile. Still even further, the embodiments provide a robust situational awareness for driving at the limits of vehicle handling. Other advantages exist which will become evident throughout the disclosure.

FIG. 1 is a block diagram illustrating an example of a computing device or computer system 100 of the vehicle which may be used in implementing the embodiments of the present disclosure. For example, the computing system 100 of FIG. 1 may be a portion of a larger computing system located within the road vehicle. The computer system 100 includes one or more processors 102,106 and/or slip and velocity processing module 104. Processors 102,106 and slip and velocity processing module 104 may include one or more internal levels of cache (not shown) and a bus controller 122 or bus interface unit for direct interaction with the processor bus 112. Processor bus 112, also known as the host bus or the front side bus, may be used to couple the processors 102,106 and slip and velocity processing module 104 with the computer system interface 114. Computer system interface 114 may be connected to the processor bus 112 to interface other components of the computer system 100 with the processor bus 112. For example, computer system interface 114 may include a memory controller 118 for interfacing a main memory 116 with the processor bus 112. The main memory 116 may typically include one or more memory cards and a control circuit (not shown). Computer system interface 114 may also include an input/output (I/O) interface 120 to interface one or more I/O bridges 124 or I/O devices with the processor bus 112. One or more I/O controllers and/or I/O devices may be connected with the I/O bus 126, such as I/O controller 128 and I/O device 130, as illustrated.

The I/O device 130 may also include an input device (not shown), such as an alphanumeric input device (e.g., an LCD display), including alphanumeric and other keys for communicating information and/or command selections to the processors 102,106. Another type of user input device includes cursor control, such as a mouse, a trackball, or cursor direction keys, for communicating direction information and command selections to the processors 102,106 and for controlling cursor movement on the display device and other vehicular device.

Computer system 100 may include a dynamic storage device, referred to as main memory 116, or a random access memory (RAM) or other computer-readable devices coupled to the processor bus 112 for storing information and instructions to be executed by the processors 102,106. Main memory 116 also may be used for storing temporary variables or other intermediate information during execution of instructions by the processors 102,106 and other processing modules such as the slip and velocity processing module 104. Computer system 100 may include a read only memory (ROM) and/or other static storage device coupled to the processor bus 112 for storing static information and instructions for the processors 102,106 and/or slip and velocity processing module 104, and slip and velocity processing module 104. The system set forth in FIG. 1 is but one possible example of a computer system 100 that may be employed or be configured in accordance with aspects of the present disclosure.

According to one embodiment, the above techniques may be performed by computer system 100 in response to slip and velocity processing module 104 executing one or more sequences of one or more instructions contained in main memory 116. These instructions may be read into main memory 116 from another machine-readable medium, such as a storage device. Execution of the sequences of instructions contained in main memory 116 may cause processors 102,106 and/or slip and velocity processing module 104 to perform the process steps described herein. In alternative embodiments, circuitry may be used in place of or in combination with the software instructions. Thus, embodiments of the present disclosure may include both hardware and software components.

The instructions executed by the slip and velocity processing module 104 can include determining a slip angle and corresponding velocity of the road vehicle. The slip and velocity of the road vehicle can be determined using the information collected by one or more sensors (e.g., lateral and longitudinal sensors 136, 138) placed on the road vehicle. The sensors 136,138 can also be used to detect road surface conditions. The sensors 136,138 may include a single antenna element or an array of antenna elements creating at least one focused antenna beam. In some instances, the sensors 136,138 can be used as a phased array to create a beamformer to enhance the velocity estimation. Additional processing components can also exist within the slip and velocity processing module 104, including digital signal processing components common in heterodyne systems including, but not limited to, components capable of processing signal modulation, transformation, interleaving, puncturing, digital-to-analog conversion, frequency up/down conversion, and slope estimation. Additionally, the slip and velocity processing module 104 can also contain processors for receiving ultrasonic waves and using the information received from an ultrasonic sensor (not shown) to compute the slip and velocity of the vehicle. Further, the slip and velocity processing module 104 can communicate with at least the system I/O Interface 120 for reception of the ultrasonic and radar waves.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 116. Common forms of machine-readable medium may include, but are not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of mediums suitable for storing electronic instructions.

FIG. 1 illustrates one possible computing system architecture. The computer system 100, however, is a simplified representation and can contain different arrangements of components, and may further include additional systems for performing additional processes. The computer system 100 can work jointly or independently of the additional systems that can exist within the road vehicle, as well as external devices, and/or networks. The components of the system 100 may communicate over any number of networks, including telecommunication networks and wireless networks. Further, it should be noted that the system 100 may include any number of additional or fewer components, including components used to communicate between the components shown. Also, the functionality of the components described below may be applied to two or more components of the system. For example, the sensors 136, 138, an Inertia Measurement Unit (IMU) 132, and a GPS 134, which can be initiated within the computer system 100, or may be instantiated over many components of the computer system 100 applied to two or more components of the system.

Figure 2:
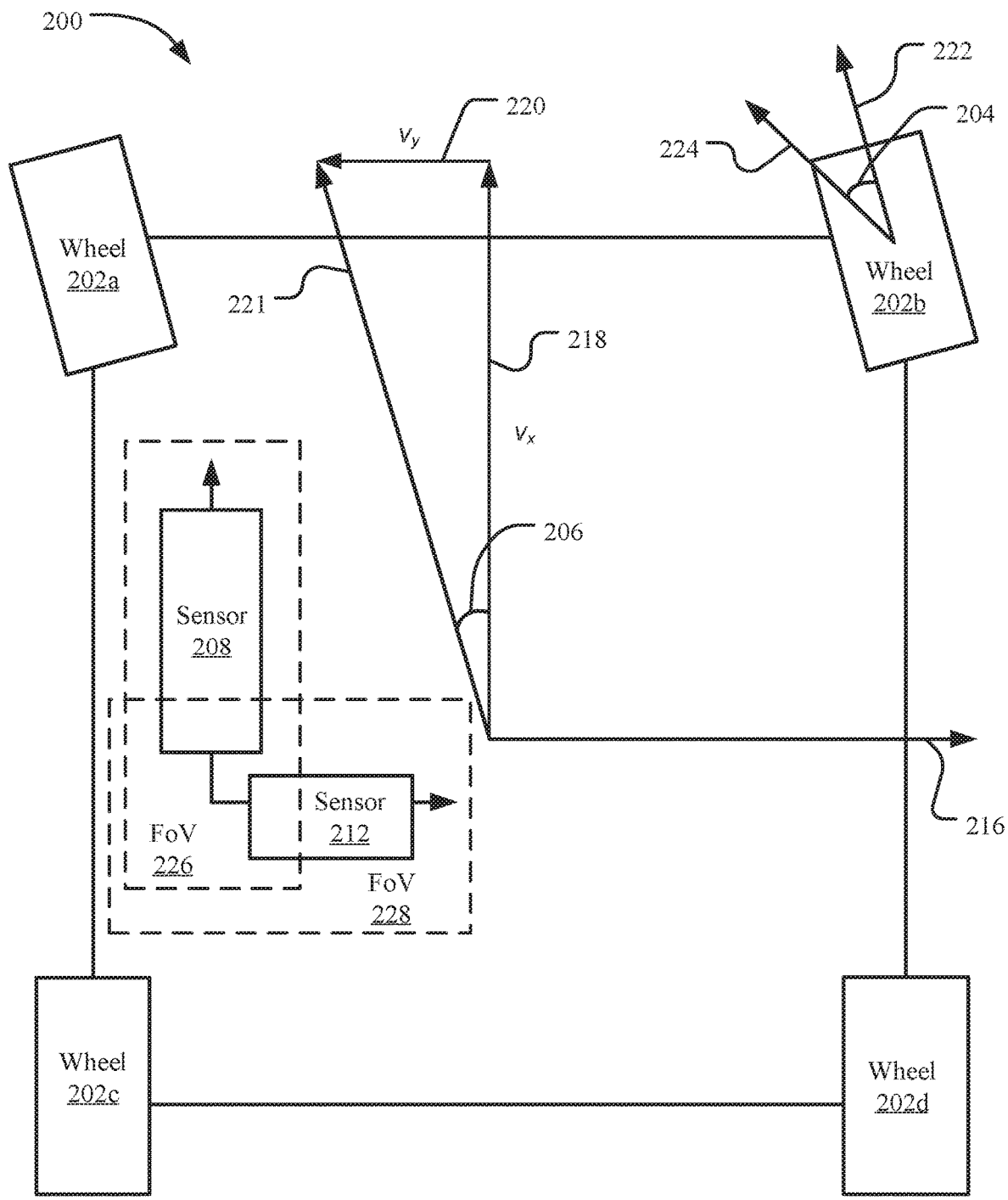
FIG. 2 is a graph illustrating slip angle.

FIG. 2 is an illustration of the underside of a vehicle 200 having four wheels 202a-202d and two orthogonally placed sensors 208, 212 (e.g., lateral and longitudinal sensors 136,138), where the vehicle 200 is moving with a longitudinal velocity 218 and a lateral velocity 220 corresponding to a slip angle 206. As introduced above, longitudinal velocity 218, lateral velocity 220 and vehicle slip angle 206 of a vehicle 200 are parameters that may be determined and used in systems involved with vehicle stability and traction, among other things. The relative motion between a tire and the road surface the tire is moving on is referred to as slip. In instances where a difference exists between the speeds, the tire's plane of rotation can exhibit a shift or tire slip angle 204 relative to the instantaneous velocity of the tire 224.

FIG. 2 depicts the underside of a road vehicle 200 where the vehicle is exhibiting a slip angle 206. Slip angle 206 is the angle of the vector sum (vehicle velocity) 221 of longitudinal velocity $v_x$ 218 and lateral velocity $v_y$ 220. Therefore, slip angle 206 is computed from the lateral velocity 216 and the longitudinal velocity 218 components, which components may also be used to compute the vehicle velocity 221. As such, longitudinal velocity 218 in combination with lateral velocity 220 can be used to determine slip angle 206 and the magnitude of the vehicle velocity 221.

Additionally, each tire 202a-202d may exhibit a local slip angle 204, referred to as "tire slip angle" that corresponds to the angle between the direction of the wheel 222 and the instantaneous velocity 224 between the point of contact of the tire and the road. The tire slip angle 204 can alter the handling qualities of a vehicle and can be used to ensure directional stability. The tire slip angle 204 can be used collectively with the slip angle 206 for better road vehicle 200 control. By identifying the slip angle 206 and controlling steering angle (not shown), vehicle sliding can be detected and managed, for example. Additionally, using the slip angle 206 and the yaw rate of the vehicle, for example, the tire slip angle 204 can be calculated and various other vehicle properties, including the limits of tire handling can be determined.

In one specific embodiment, the placement of two or more sensors 208 and 212 are used and presented to provide slip angle 206 and velocity measurements. The implementation can include these two or more sensors 208 and 212 that are orthogonally mounted on the underside of the vehicle 200 in order to obtain longitudinal and lateral velocity information such as longitudinal and lateral velocity vectors (218, 220) from which the velocity of the vehicle 221 and the slip angle 206 can be determined. The sensors 208,212 can be radio frequency (RF) sensors that can operate at gigahertz frequency. In one embodiment, GPS units 134 and IMUs 132 can be collectively used with the orthogonally placed sensors 208,212 to independently extrapolate velocity before or while the orthogonal sensors 208,212 are being used to determine vehicle velocity 221 and the slip angle 206. In another embodiment, other sensors may be used, including, but not limited to optical, yaw, wheel speed, gyroscopic, ultrasonic and the like in conjunction with the orthogonal sensors 208, 212 to provide additional inputs for determining slip, vehicle velocity and other possible measurements. For example, wheel speed sensors can be used to determine the speed of the vehicle's tire rotation. This information can be merged with the information obtained from the two sensors (e.g., 208 and 212) to obtain greater detail associated with the computation of the velocity estimate. Further, the sensors 208, 212 are not limited to being placed adjacent (proximate) to each other and can be placed at a distance from each other such that the field of view 226, 228 (e.g., the dimensions of visible ground area or visual field) of the surface under the vehicle 200 remains relative to the forward/rearward and side/side motion of the vehicle.

As indicated above, the sensors 208,212 can be orthogonally mounted and can be radar sensors. Radar sensors operate by emitting radio frequency waves toward an object, such as the road, and receiving the reflected radio frequency waves to determine the properties of the object. Similarly, sensors 208,212 can be radar sensors emitting radio waves toward the surface of the road and receiving the reflected radio frequency waves to determine the properties of the ground surface, such as ice on the road and potholes in the road, etc. In addition, the radar sensors may be multi-purposed such that in addition to being used for determining slip angle and vehicle velocity, the radar sensors may be used for the detection of other vehicles or objects. Orthogonal placement of sensors 208, 212 can include placement of the sensors 208, 212 in a perpendicular manner on the underside of the vehicle 200 such that a right (90°) angle exists between the sensors 208,212. In some instances, the sensors 208,212 may not be orthogonally placed and instead placed angled from each other (e.g., at a 45° angle). In addition, these sensors 208, 212 can also be placed horizontally or partially horizontal among other configurations. FIGS. 3A and 3B provide two instances where sensor placement is varied on a vehicle 300. For example, FIGS. 3A and 3B illustrate an exterior placement of one or more sensors 208, 212.

FIG. 3A, illustrates a first configuration with one or more sensors 208, 212 orthogonally placed in a horizontal manner. Horizontal placement of the sensors refers to a positioning of the sensors in a manner such that the field of view of the sensors 208, 212 is approximately symmetrical about a center line 310, where the center line 310 is approximately normal to the surface of the road 316. For example, in FIG. 3A, sensors 208, and 212 are illustrated having horizontal placement such that the field of views 226,228 of the sensors 208, 212 are approximately symmetrical about the center line 310, where the center line 310 is perpendicular to the surface of the road 316. In some instances, the normal angle of projection (e.g., angle of the center line 310) is perpendicular to the surface of the road 316, with the perspective of the sensors 208,212 positioned to view downward toward the surface of travel. As illustrated, an area 302 is representative of the field of view 226 of sensor 208, whose placement permits the vehicle's longitudinal velocity vector to be measured. Similarly, sensor 212, which is orthogonal to sensor 208, which can also have a horizontal placement on the underside of the vehicle 300 can have a downward facing field of view 228 which is represented by area 304 and can be used to measure the vehicle's lateral velocity vector. Since the relative distance to the ground is quite near and the wavelength is not sufficiently short to reach far-field, the width of the beam projected by the sensors 208,212 may not be very narrow. Therefore, the wide beam projected by the sensors 208, 212 enables the computation of the velocity component using, for example, a polynomial fit on the frequency response of the Doppler shift.

FIG. 3B illustrates a second configuration with one or more sensors 208, 212. In this figure, the placement of the sensors 208,212 can deviate from a horizontal placement. Such a placement can include the placement of the sensors 208,212 such that one or both sensors are placed on the underside of the vehicle 300 at an angle that enables the sensors 208,212 to project the electromagnetic waves in a way so that the field of views 226, 228 remain in the near-field region of the sensors and the fields of view collects upcoming road surface information. For example, in FIG. 3B, sensors 208, and 212 are illustrated such that a center line 312 of the field of view 226,228 of the sensors 208, 212 is no longer perpendicular to the surface of the road 316, but instead the field of view 226,228 of the sensors 208, 212 is angled about a center line 312 where the center line 312 is oblique to the surface of the road 316 and the field of view 226,228 of the sensors 208,212 remain in the near-field region. That is to say, the angle of projection 314 is tilted such that forthcoming road 316 surface characteristics and corresponding velocity components can be measured using the forward angled field of view. In some instances, the angle of projection 314 or angle of the center line 312 is obtuse to the surface of the road 316, with the perspective of the sensor(s) positioned to view toward the front (F) of the vehicle. In other instances, the angle of projection 314 or angle of the center line 312 is acute to the surface of the road 316. In addition and generally, with respect to the embodiments of FIG. 3A or 3B, placement of the sensors 208,212 on the underside of the vehicle 300 can minimize the field of views 226,228 from being obstructed by external objects that can interfere with signal collection.

In one embodiment, the placement of the partially horizontally placed sensors 208,212 is such that the Doppler shift of the signals is measured by tracking the distance between points, within areas 306,308 which are representative of the field of views 226, 228 of sensors 208,212 respectively. By placing the sensor 208 in a partially horizontal position, a tighter peak (e.g., clutter ridge—described below) can be achieved on the frequency response providing a possibly more precise longitudinal (e.g., forward as shown in FIG. 3B) estimation. In contrast, the sensor 212 is arranged for lateral velocity and may be horizontally positioned. Therefore, the sensor 208 may be partially horizontal relative to the underside of the vehicle, so as to align the field of view projection in the direction of the forthcoming road surface with sensor 212 horizontal. As indicated, a partially horizontal placement of the sensor(s) 208 and/or 212 can provide velocity components relative to the road surface 316 to be encountered which can be used in the vehicle velocity 221 and slip angle 206 estimation. While the sensors are shown viewing the surface under the vehicle, it is also possible to place the sensors 308,312 on a side of the vehicle, extending from the roof, and in other positions where lateral and/or longitudinal velocity may be obtained with a view of the surface upon which the vehicle is traveling.

In addition to the one or more orthogonally placed sensors 208,212, as previously indicated, additional components can be collectively used with the sensors 208,212 to enhance slip angle reading. For example, an Inertia Measurement Unit (IMU) 132 can be collectively used with the sensors 208,212 for noise reduction and to independently extrapolate velocity before or while the orthogonal sensors are being used to determine vehicle velocity 221 and slip angle 206. The Inertia Measurement Unit 132 can aid in reducing noise of the estimate as well as in removing outliers that may occur from false returns as obstacles can temporarily appear under the road vehicle (e.g., an object blowing under the vehicle). As another example, a Global Positioning System (GPS) unit 134 can also be collectively used with the sensors 208,212 to improve sensor alignment and calibration. As an example, the data gathered by the GPS unit 134 can aid in error correction and location synchronization of the sensors 208,212. In addition, or alternatively, the GPS data or data from another perception unit can be used to improve vehicular estimates such as altitude and position, as well as to determine whether objects (e.g., pot hole in the road, flying plastic bag that goes under the car, a tree branch) encountered are static or in motion.

An additional sensor may be placed on the underside of the vehicle 200, or other locations, to form a triad of sensors. Information from the other sensor(s) may be used to compliment, error correct, or otherwise be used in conjunction with the orthogonal sensor information. The triad of sensors can be used to reduce the effect of vehicle heave rate, roll rate, and pitch rate, on the computation of slip and velocity among other advantages. The heave rate corresponds to the suspension's natural frequency in ride, while roll and pitch rate represent the rotation about a given axis (e.g., pitch is y-axis, roll is x-axis). The combination of sensors can also be created from the use of other sensors placed on the vehicle 300. That is to say, any one or more of the sensors described above, and in conjunction with at least FIG. 2, can be included to provide an added degree of information that may be used in computing the velocity and/or slip angle measurement. For example, the sensors 208,212 may move, bounce, tilt, etc. in conjunction with vehicle heave, roll, and pitch rate. The use of a third or other sensor(s) tied to heave, roll, and pitch may provide information about such characteristics encountered by the vehicle, and the sensors 208, 212 mounted thereon, such that the effect (or effects) are corrected and/or accounted for during the velocity and slip angle measurements.

Alternatively, a second set of ultrasonic sensors and corresponding hardware/software can be placed on the underside of the vehicle 200 or in a position with a sufficient view of the travel surface. This second set of sensors can also be orthogonally placed with a horizontal or partially horizontal orientation and used for slip angle 206 and velocity measurements as described herein. In some instances, the ultrasonic sensors can work independently of the radar sensors transmitting the radio frequency waves. In other instances, the radar sensors may work independently of the ultrasonic sensors for velocity estimation. Still, in other instances, both the ultrasonic sensors and the radar sensors can work mutually to enhance velocity estimation.

Figure 4:
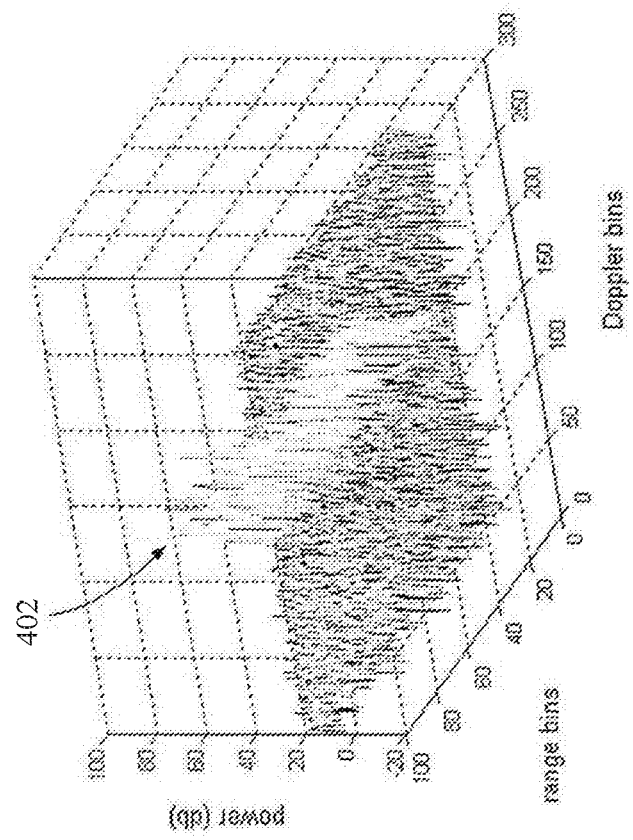
FIG. 4 is a graph illustrating Doppler data, and particularly emphasizing a clutter ridge in such data that may be exploited to obtain slip and velocity information, in one embodiment.

An obstacle that is often encountered in computing velocity and slip on a road vehicle is an accumulation of power over an area. This accumulation of power, known as a clutter ridge, can lead to a large area of interference or a large peak on the Doppler map and thus create the inability to identify a vehicle/target located within the contours of a Doppler map. FIG. 4 is a graph illustrating Doppler data. As it is well understood in the art, incoming reflected signals can be organized into a Doppler map 400 as illustrated in FIG. 4. Note that the Doppler map 400 is not limited to factors illustrated on the map and can include a range of time over velocity, wavelength, frequency, etc.

The Doppler map 400 is a mapping of the incoming signal strength power as it is aggregated over a range of frequencies. Often times, the Doppler map 400 includes a main lobe known as a clutter ridge 402 which represents a peak running across a narrow range of Doppler values that extend the range of a radar scan. The presence of this running peak (e.g., clutter ridge 402) can generally be noisy and interference bound. Consequently, it is difficult to identify the velocity of a road vehicle within this range. Therefore, in conventional radar systems, it is preferable to identify solutions outside the clutter ridge 402. In some conventional instances, a means for suppressing the clutter ridge 402 has been adopted. In the embodiment discussed herein, however, the clutter ridge 402 is embraced and used to determine the road vehicle velocity.

Figure 5:
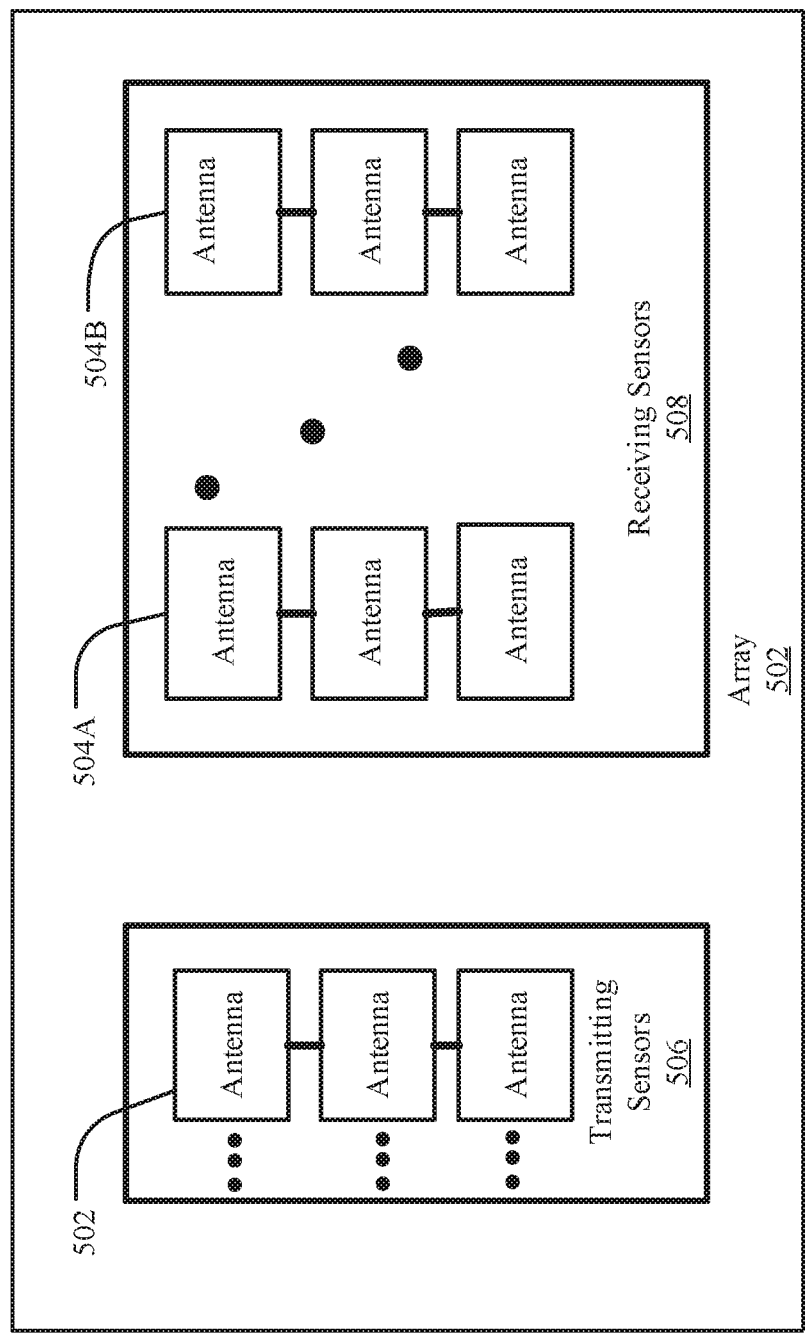
FIG. 5 illustrates a set of linear sensor arrays that may be used in one of the orthogonally arranged sensors, in one embodiment.

FIG. 5 illustrates a specific example of the orthogonal sensors 208 and/or 212 operable in the clutter ridge with the use of beamforming. In this example, sensor 208 can be a combination of linear sensor/antenna arrays 502, 504A-504B configured to function as both a transmitter and a receiver. The transmitting portion can be performed by an array of transmitting sensors 506 and the receiving portion can be performed by an array of receiving sensors 508. As transmitting sensors 506, the sensors 506 emit electromagnetic waves toward the ground at radio frequencies. In one embodiment, millimeterwave frequencies can be used as a preferred transmission frequency. An advantage to using millimeterwave is the ability to minimize the distance to far-field, as wavelength is proportional to frequency. Sample millimeterwave frequencies used for transmitting the electromagnetic waves can include, but are not limited to, the 24 GHz ISM K-band, and 77 GHz, 79 GHz in the W-band. In some instances, the kilohertz to megahertz frequency range may be targeted when ultrasonic sensors are used.

Another advantage to the use of millimeterwave is the ability to decrease antenna size. Antenna apertures are a function of frequency, as such; higher frequencies decrease antenna size permitting an array of antennas on a smaller area. The use of an array of antennas therefore increases the overall collective aperture of the sensor, providing a higher system gain and thus a smaller angular beam width. Thus, the collective use of an array 502, 504A-504B enables beamforming for both a focused transmission of radio frequency waves to the ground/road 316 and a focused reception of the reflected radio frequency waves.

As indicated, sensor 208 can also function as a receiving medium (e.g., receiving sensors 508) for the transmitted radio waves emitted by transmitting sensors 506. The receiving sensors 508 can also consist of numerous and/or an array of antennas 504A-504B designed to receive the emitted electromagnetic waves from the transmitting sensors 506 as the electromagnetic waves reflect from the ground/road 316.

In other words, sensor 208 can create a monostatic radar. The monostatic radar is a radar unit with both the transmitter and the receiver collocated. The monostatic radar uses the arrays at the transmit and receive sensors 506, 508 to create a beamformer. The transmitting sensor 506 can transmit a series of focused radio waves illuminating the ground, which get reflected and detected/received by the receiving sensor 508. The receiving portion of sensor 508 can create a phased array which can act as a receive beamformer. Transmitting sensor 506 can transmit the radio waves as a continuous waveform and can additionally modulate the signal for interference mitigation.

Because the sensor 208 can include numerous antennas 502, 504A, and 504B, the spatial domain can be exploited. The spatial domain provides an added degree of freedom for determining at least velocity and elevation using a spatial transform. Fourier Transforms may be used for suppressing interference created by objects on the road and locating the vehicle and the vehicle velocity within the clutter ridge. As an example, transmitting sensor 506 can illuminate a portion of the road beneath the vehicle and the multiple received channels from the beamforming receiving sensor 508 can receive the transmitted signal, take its spatial transform in the longitudinal dimension of the vehicle, and determine the Doppler shift versus the angle. The dominant slope of the resulting Doppler map can then be used to understand the vehicular velocity. Similarly, the lateral velocity can be obtained using a second sensor (e.g., sensor 212) oriented orthogonally. Thus, vehicle velocity and/or slip angle can be completing a trigonometry computation, for example. Vehicle velocity estimation using beamforming sensors can include both radar and ultrasonic sensors.

Figure 6:
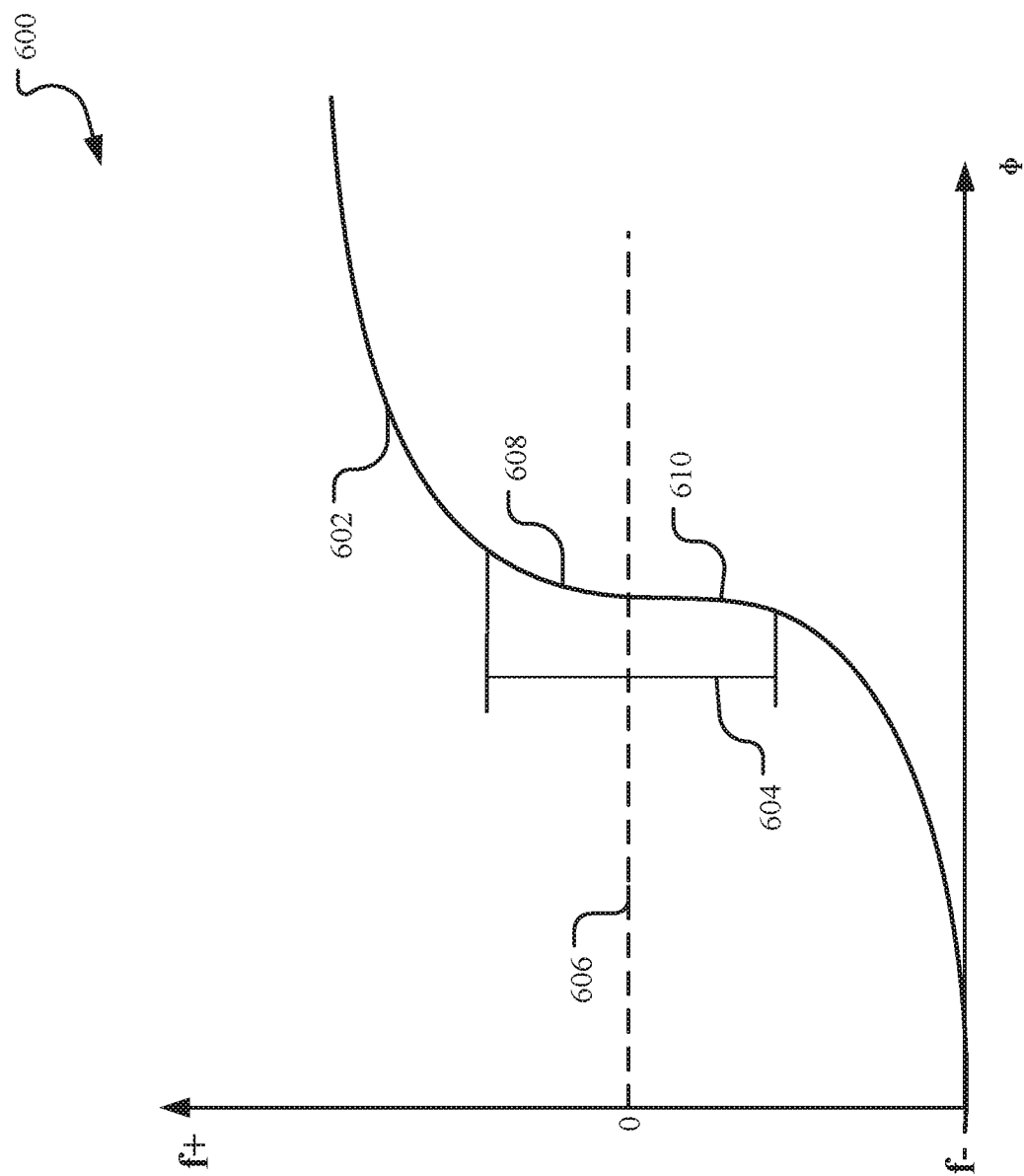
FIG. 6 is a graph illustrating the Doppler of a moving road vehicle, in one embodiment.

FIG. 6 is a graph illustrating the Doppler of a moving road vehicle. As described above, and in conjunction with FIG. 4, Doppler mapping generally includes a clutter ridge. The clutter ridge is an area of high peak values that extends for the range of the radar scan. In the present embodiment, the high peak range will be exploited by identifying a region 604 within the Doppler function 602, which is indicative of the velocity of the road vehicle. As an example, region 604 can include the range of frequencies in which the road vehicle can be operating at. Therefore, a stationary road vehicle can ideally stand at a 0 velocity 606, a forward moving vehicle can lay on the forward slanting slope 608 of the Doppler function 602 going on a positive frequency (f(+)) direction, and a backward moving vehicle can lay on the declining slope 610 of the Doppler function 602 going in a negative frequency (f−) direction. Similarly, the lateral velocity can also be measured using a Doppler function with corresponding frequency components using a second orthogonal sensor (e.g., sensor 212). Therefore, the sensors 208,212, through spatial transformation, can be used to identify a line of a certain slope that maps to the desired velocity by finding the dominant return.

Figure 7:
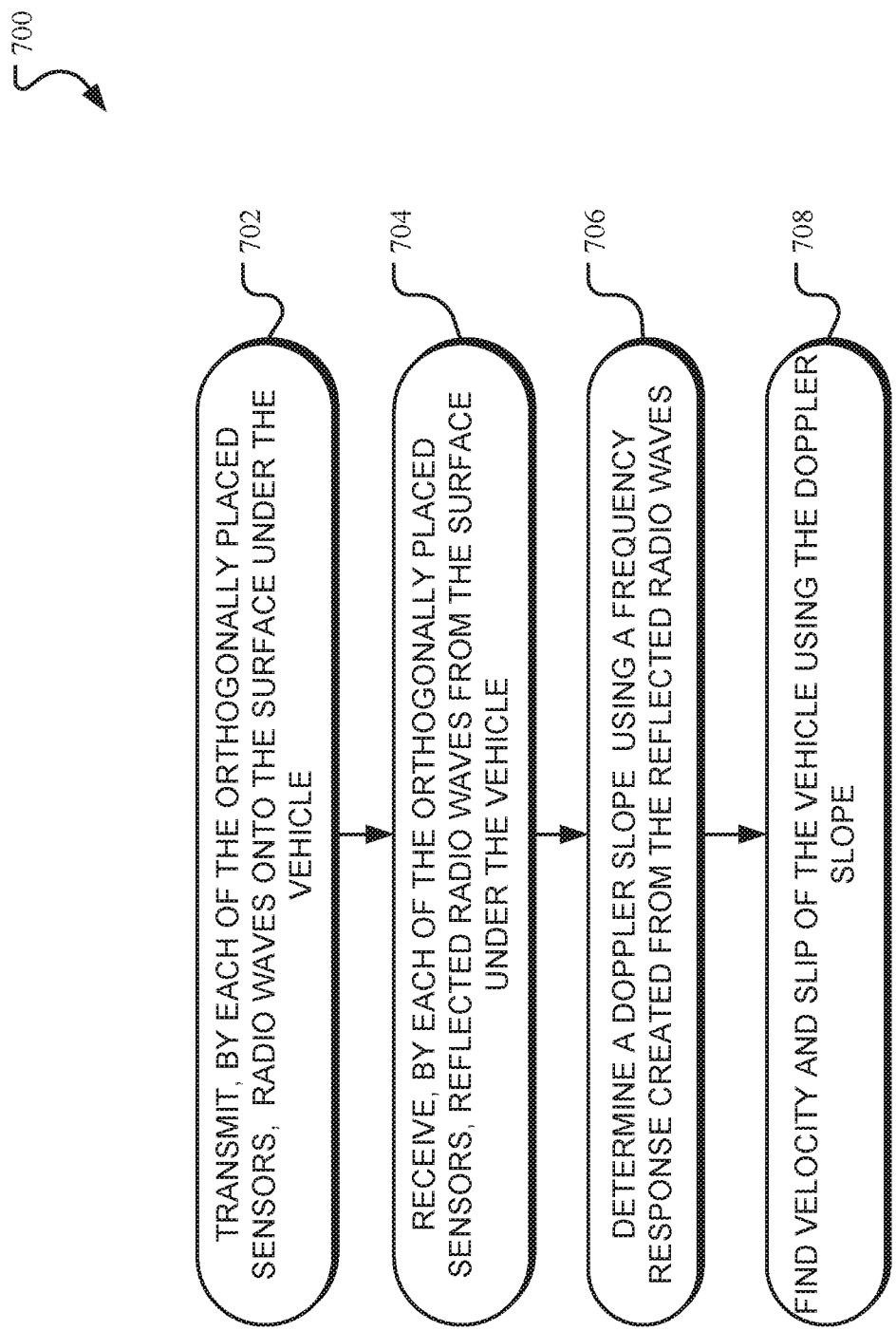
FIG. 7 is a flowchart for a method to measure slip and velocity, in one embodiment.

FIG. 7 is a flowchart for a method for measuring slip and velocity of a road vehicle. The process generally begins with one or more sensors located on the underside of the road vehicle. The sensors can be orthogonally placed, which can help in obtaining both longitudinal and lateral information. One or more of the sensors can be placed horizontally (e.g., facing downward) relative to the ground. Alternatively, the one or more of the sensors can be placed at least partially horizontal. Also, one or more sensor sets can be placed on the underside of the vehicle such that two velocity estimations can simultaneously occur. For example, an RF/radar sensor set can be used for velocity and independently or simultaneously, a set of orthogonal ultrasonic sensors are also used for velocity calculation.

Additionally, the one or more sensors can include an array of antennas which can be used to focus the beam of the transmitted signals downward, illuminating the ground. Each row within the transmitting sensor array can independently represent a channel, in order to introduce spatial diversity and beamforming. Alternatively, a single sensor with a transmitting portion can be used for ground illumination, presenting a wider beam used for RF signal transmission. The method for velocity estimation, therefore, begins with the operation of transmitting radio waves in step 702. A road vehicle in motion will have a lateral and longitudinal component as described above and in conjunction with FIG. 2, which can be computed based at least in part from the transmitted radio waves.

The operation then continues to step 704, where the transmitted signals are received by a second portion of the sensor as the waves are reflected from the ground. The ground reflection provides a frequency response that can be used for determining the Doppler slope in step 706. In instances where a single sensor exists at the transmit end, a polynomial fit can be used to identify the slope of the Doppler curve. In other instances where an array is used for transmitting the radio waves at step 702, a receiving beamformer is used in steering the array for signal reception and a spatial transform is solved to determine the velocity and even location of the vehicle. When a receiving beamformer is used, each of the antenna elements can be treated independently and thus reception of the incoming waves can be analyzed with greater accuracy. In addition, the transmitting sensor can steer the beam in the desired direction while using the clutter ridge with high peak data for slip detection.

A similar operation can also run simultaneously on an orthogonally placed sensor which is collecting lateral information using a similar method. That is to say, an orthogonal sensor can include one sensor or an array of sensors can use a transmitting portion to reflect waves on the ground, while a second portion collects the reflected waves to determine a Doppler curve that will be used to determine lateral velocity.

In addition, during the operation of step 704, environmental characteristics can be obtained from other sensors. These sensors can be located throughout the vehicle, and can be used for sensor triangulation and/or for merging with other systems, such as GPS units and IMU units. As described above, the additional sensors and/or the GPS, IMU can be used to provide additional measurements that can be combined with the orthogonal sensors to provide additional measurements that may be used for slip angle and velocity estimations.

A frequency response, also known as a Doppler map is generated using the information obtained and the Doppler slope is determined in step 706. A clutter ridge, which is a peak region running across a narrow range of Doppler values that extend the range of a radar scan is present in the Doppler map. This peak is embraced such that the frequency response used to determine the Doppler slope is located within the clutter ridge. The Doppler slope can be determined using polynomial fitting, signal processing, and/or spatial transformations as described above.

Once the Doppler slope has been determined in step 706, the operation can proceed to step 708, where the vehicle velocity and slip angle can be determined. As indicated above and in conjunction with FIG. 2, slip angle 206 is the angle of the vector sum of longitudinal velocity $v_x$ and lateral velocity $v_y$. Longitudinal velocity can be computed from the longitudinal received signals obtained at the receiving sensor (e.g., for sensor 208, receiving sensors 504). The lateral velocity can be computed from the received signals obtained at the lateral receiving sensor (which can be orthogonally located to the sensor used in conjunction with the longitudinal velocity). The measured signals will have frequency responses that depend on the respective longitudinal and lateral velocities of the vehicle. The frequency response, located within the clutter ridge, can then be used to obtain the Doppler slope for each sensor as indicated in step 706 above. The longitudinal and lateral velocities, obtained from the Doppler slopes, can then be used to compute the slip angle. Hence, the slip angle can be computed from estimates of lateral and longitudinal velocity. Similarly, the magnitude of the vehicle velocity can be computed from the estimates of lateral and longitudinal velocity. The computed vehicle velocity and/or slip angle may be provided to at least the computing system of FIG. 1, and then used in road vehicle stability and control functions.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a vehicle having an underside;
   a first sensor mounted on the underside of the vehicle, the first sensor capturing a first plurality of electromagnetic waves, a first frequency response determined from the first plurality of electromagnetic waves, a first Doppler slope generated from the first frequency response; and
   a second sensor mounted on the underside of the vehicle and orthogonally positioned relative to the first sensor, the second sensor capturing a second plurality of electromagnetic waves, a second frequency response determined from the second plurality of electromagnetic waves, a second Doppler slope generated from the second frequency response, one or more of a slip angle and a velocity determined from the first Doppler slope and the second Doppler slope.

2. The system of claim 1, wherein the first sensor and the second sensor are radar sensors and the first plurality of electromagnetic waves and the second plurality of electromagnetic waves are radio frequency waves.

3. The system of claim 1, wherein one or more of the first sensor and the second sensor is mounted at least one of partially horizontally, angled, or horizontally.

4. The system of claim 1, wherein each of the first sensor and the second sensor includes a single antenna element or an array of antenna elements.

5. The system of claim 1, wherein the first Doppler slope is generated from the first frequency response and the second Doppler slope is generated from the second frequency response using at least one of polynomial fitting, signal processing, or spatial transformation.

6. The system of claim 1, wherein each of the first sensor and the second sensor includes at least one transmitting sensor and at least one receiving sensor.

7. The system of claim 1, further comprising:
   a third sensor mounted on the vehicle to form a triad of sensors, the third sensor being at least one of optical, yaw, wheel speed, gyroscopic, or ultrasonic.

8. The system of claim 1, wherein the first sensor and the second sensor form a first sensor set and a second sensor set is mounted on the vehicle, the second sensor set at least one of simultaneously with or independently of the first sensor set determines one or more of the slip angle and the velocity.

9. The system of claim 1, wherein the first frequency response is located within a first clutter ridge and the second frequency response is located within a second clutter ridge.

10. The system of claim 1, wherein longitudinal velocity is determined from the first Doppler slope and lateral velocity is determined from the second Doppler slope, the slip angle and the velocity being determined from the longitudinal velocity and the lateral velocity.

11. A method comprising:
    determining a first frequency response from a first plurality of electromagnetic waves captured using a first sensor mounted on a vehicle, the first frequency response including longitudinal velocity information;
    determining a second frequency response from a second plurality of electromagnetic waves captured using a second sensor mounted on the vehicle, the second frequency response including lateral velocity information;
    generating a longitudinal velocity of the vehicle from the first frequency response;
    generating a lateral velocity of the vehicle from the second frequency response; and
    generating one or more of a slip angle and a magnitude velocity of the vehicle from the longitudinal velocity and the lateral velocity.

12. The method of claim 11, wherein the first frequency response is located within a first clutter ridge and the second frequency response is located within a second clutter ridge.

13. The method of claim 11, wherein the first sensor and the second sensor are each mounted on an underside of the vehicle orthogonally to each other.

14. The method of claim 11, wherein the slip angle is generated based on an angle of a vector sum of the longitudinal velocity and the lateral velocity.

15. The method of claim 11, wherein the longitudinal velocity is generated by generating a Doppler slope of the first frequency response using at least one of polynomial fitting, signal processing, or spatial transformation.

16. The method of claim 11, wherein the lateral velocity is generated by generating a Doppler slope of the first frequency response using at least one of polynomial fitting, signal processing, or spatial transformation.

17. A system comprising:
    a vehicle having an underside;
    a longitudinal sensor mounted on the underside of the vehicle;
    a lateral sensor mounted on the underside of the vehicle;
    a longitudinal transmitting portion of the longitudinal sensor, the longitudinal transmitting portion transmitting a first electromagnetic signal;
    a lateral transmitting portion of the lateral sensor, the lateral transmitting portion transmitting a second electromagnetic signal;
    a longitudinal receiving portion of the longitudinal sensor, the longitudinal receiving portion capturing a first reflection of the first electromagnetic signal, the first reflection including longitudinal velocity information, a longitudinal velocity of the vehicle generated from the longitudinal velocity information; and
    a lateral receiving portion of the lateral sensor, the lateral receiving portion capturing a second reflection of the second electromagnetic signal, the second reflection including lateral velocity information, a lateral velocity of the vehicle generated from the lateral velocity information, a slip angle of the vehicle determined from an angle of a vector sum of the longitudinal velocity and the lateral velocity.

18. The system of claim 17, wherein the longitudinal sensor is mounted orthogonal to the lateral sensor.

19. The system of claim 17, wherein the lateral transmitting portion and the longitudinal transmitting portion each include a single transmitting antenna or an array of transmitting antennas and the lateral receiving portion and the longitudinal receiving portion each include a single receiving antenna or an array of receiving antennas.

20. The system of claim 17, wherein the first reflection includes a first frequency response comprising the longitudinal velocity information and the second reflection includes a second frequency response comprising the lateral velocity information, the longitudinal velocity generated from a first Doppler slope generated from the first frequency response, and the lateral velocity generated from a second Doppler slope generated from the second frequency response.

\* \* \* \* \*